United States Patent
Vu

(10) Patent No.: US 10,336,126 B2
(45) Date of Patent: *Jul. 2, 2019

(54) METHODS FOR PLACING AN EMV CHIP ONTO A METAL CARD

(71) Applicant: Jonny B. Vu, San Jose, CA (US)

(72) Inventor: Jonny B. Vu, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/422,784

(22) Filed: Feb. 2, 2017

(65) Prior Publication Data
US 2018/0281503 A1    Oct. 4, 2018

(51) Int. Cl.
| | | |
|---|---|---|
| *B29C 35/02* | (2006.01) | |
| *B29C 53/04* | (2006.01) | |
| *B29C 53/84* | (2006.01) | |
| *B42D 25/47* | (2014.01) | |
| *G06K 19/02* | (2006.01) | |
| *G06K 19/04* | (2006.01) | |
| *B42D 25/305* | (2014.01) | |
| *B42D 25/373* | (2014.01) | |
| *G06K 19/077* | (2006.01) | |

(52) U.S. Cl.
CPC ............ *B42D 25/47* (2014.10); *B29C 35/02* (2013.01); *B29C 53/04* (2013.01); *B29C 53/84* (2013.01); *B42D 25/305* (2014.10); *B42D 25/373* (2014.10); *G06K 19/02* (2013.01); *G06K 19/044* (2013.01); *G06K 19/07743* (2013.01); *G06K 19/07745* (2013.01); *G06K 19/07747* (2013.01); *Y10T 156/1153* (2015.01)

(58) Field of Classification Search
CPC ................. B42D 25/47; G06K 19/044; G06K 19/07743; G06K 19/07745; G06K 19/07747; Y10T 156/1153
See application file for complete search history.

(56) References Cited

U.S. PATENT DOCUMENTS

2018/0130049 A1*  5/2018  Busch ................. G06K 19/077

OTHER PUBLICATIONS

BETA EMV Chip Swap™ Procedure. Posted Aug. 8, 2016. https://metal-creditcard.com/2016/08/beta-emv-chip-swap-procedure/ (Year: 2016).*

* cited by examiner

*Primary Examiner* — Carson Gross

(57) ABSTRACT

A method for removing an EMV chip from a plastic credit card or debit card and placing the removed EMV chip onto a metal card, includes heating the plastic credit or debit card containing the EMV chip to loosen the EMV chip, the EMV chip being substantially square and planar, the EMV chip having an upward top face, a downward bottom face, and four sides; removing the loosened EMV chip from the plastic credit or debit card; bending the four sides of the EMV chip towards the downward bottom face of the EMV chip; applying an adhesive coating to the bottom face and the bended four sides of the EMV chip; and placing the adhesive coated bottom face and bended four sides of the EMV chip into a holding cavity of the metal card.

11 Claims, 2 Drawing Sheets

METHODS FOR PLACING AN EMV CHIP ONTO A METAL CARD

FIELD OF THE INVENTION

The invention relates to methods for placing an EMV chip onto a metal card and more particularly, to methods for removing an EMV chip from a plastic credit card or debit card and placing the removed EMV chip onto a stainless steel metal card or debit card.

BACKGROUND OF THE INVENTION

Credit cards and debit cards were originally developed using a magnetic stripe or mechanical imprint to read and record account data, with the customer's signature being used for verification. Under this system, the customer handed their card to the clerk at the point of sale, who either swiped the card through a magnetic reader or made an imprint from the raised text on the card. With the magnetic reader, the system verified the account information and printed a slip for the customer to sign. For the imprinted text, the transaction details were filled in and the customer signed the imprinted slip. In both cases, the clerk verified that the customer's signature matched the signature on the back of the card. While being convenient and useful, this system has a number of security flaws, including the ability to copy the card's information, or by reading and writing the magnetic stripe of the card during a transaction, making these cards easy to duplicate and use without the owner's knowledge.

To address this problem, smart cards (also called chip cards or IC cards) were developed, which have the ability to store a user's account data on an integrated circuit. EMV, which stands for Europay, MasterCard, and Visa, was developed as a technical standard for smart cards and for payment terminals and automated teller machines that can accept them. EMV cards store their data on integrated circuits as well as on magnetic stripes for backward compatibility. These cards can be physically inserted into a card reader or can be read over short distances using radio-frequency identification (RFID) technology. Payment cards that comply with the EMV standard are often called Chip and PIN or Chip and Signature cards, depending on the authentication methods employed by the card issuer.

Most plastic credit cards and debit cards issued by banks and credit card companies are boring and unimpressive to look at for the average consumer. These institutions sometimes offer cards with various sports team designs or "cute" animal designs that may liven up the plastic card's look and appeal, however, the standard bank or credit card company logo is usually included on the card issued to the owner. As such, there is nothing that distinguishes an affluent, sophisticated card holder from an average card holder. Therefore, there remains a need in the art for new types of credit cards and debit cards that are more appealing to the average consumer.

SUMMARY OF THE INVENTION

The invention provides new methods for removing an EMV chip from a plastic credit card or debit card and placing the removed EMV chip onto a metal card, by heating the plastic credit or debit card containing the EMV chip to loosen the EMV chip, the EMV chip being substantially square and planar, the EMV chip having an upward top face, a downward bottom face, and four sides; removing the loosened EMV chip from the plastic credit or debit card; bending the four sides of the EMV chip towards the downward bottom face of the EMV chip; applying an adhesive coating to the bottom face and the bended four sides of the EMV chip; and placing the adhesive coated bottom face and bended four sides of the EMV chip into a holding cavity of the metal card.

DETAILED DESCRIPTION

Figure 1:
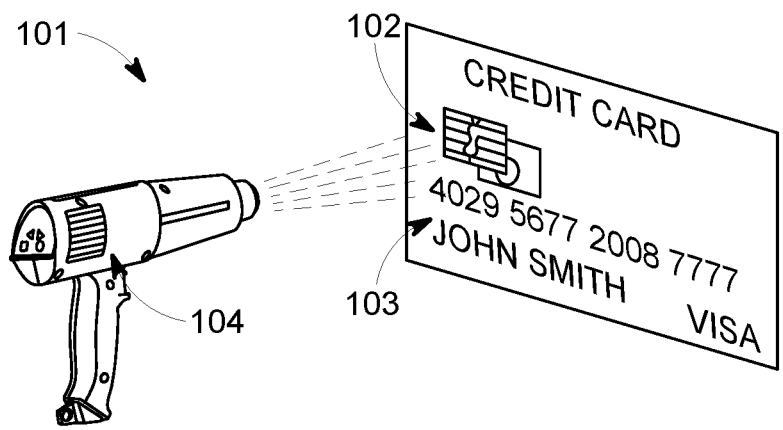
FIG. 1 illustrates an embodiment for removing an EMV chip from a plastic credit card or debit card and placing the removed EMV chip onto a metal card by first heating the plastic credit or debit card containing the EMV chip in order to loosen the EMV chip.

FIG. 1 illustrates an embodiment for removing an EMV chip from a plastic credit card or debit card and placing the removed EMV chip onto a metal card. In order to loosen the EMV chip, the plastic credit or debit card containing the EMV chip is first heated. In an embodiment, heating the plastic credit or debit card includes heating a front face and/or a back face of the card with a heat source such as a heat gun and the like. In an embodiment, the heat source can be set between 350° F. to 400° F. and applied to the front and/or back face of the card for 5 seconds to about 60 seconds. In other embodiments, the heat source can be set at about 370° F. and applied to the front and/or back face of the card for about 10 seconds to 30 seconds. In an embodiment, the EMV chip can be substantially square and planar, the EMV chip having an upward top face, a downward bottom face, and four sides.

In embodiments, the metal card can be made of stainless steel or any other suitable metal or alloy. Further, the metal card can be of any desired colored including but not limited to black, gold (rose, white or yellow gold), titanium, and the like or any combinations thereof. In addition, the metal card can include imprinted information including but not limited to the user's name, account information, and any desired ornamental design.

Figure 2:
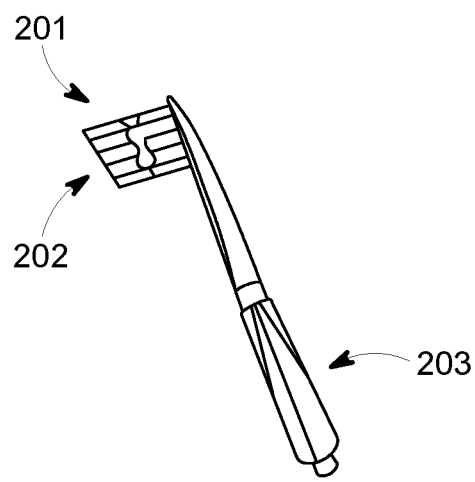
FIG. 2 illustrates an embodiment for removing an EMV chip from a plastic credit card or debit card and placing the removed EMV chip onto a metal card by removing the loosened EMV chip from the plastic credit or debit card.

FIG. 2 illustrates an embodiment for removing an EMV chip from a plastic credit card or debit card and placing the removed EMV chip onto a metal card by removing the loosened EMV chip from the plastic credit or debit card. In an embodiment, a pick and/or tweezers or other similar instruments can be used to loosen or pry off the EMV chip from the plastic credit or debit card.

Figure 3:
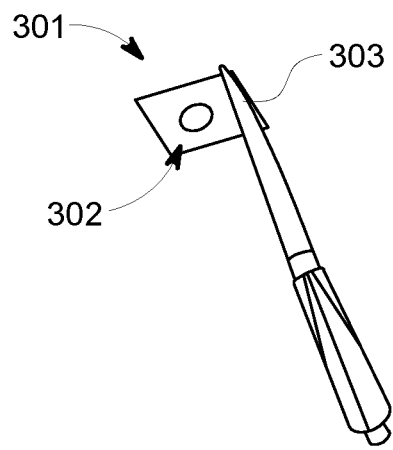
FIG. 3 illustrates an embodiment for removing an EMV chip from a plastic credit card or debit card and placing the removed EMV chip onto a steel metal card by bending the four sides of the removed EMV chip towards the downward bottom face of the EMV chip.

FIG. 3 illustrates an embodiment for removing an EMV chip from a plastic credit card or debit card and placing the removed EMV chip onto a metal card by bending the four sides of the removed EMV chip towards the downward bottom face of the EMV chip. In an embodiment, the four sides of the EMV chip can be bent towards the downward bottom face of the EMV chip. In another embodiment, the four sides can be bent towards the downward face of the EMV chip, wherein each of the bended four sides are substantially perpendicular to the downward bottom face.

Figure 4:
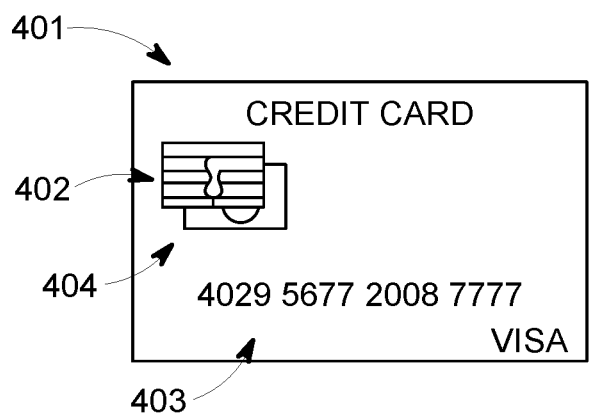
FIG. 4 illustrates an embodiment for removing an EMV chip from a plastic credit card or debit card and placing the removed EMV chip onto a metal card by applying an adhesive coating to the bottom face and the bended four sides of the EMV chip.

FIG. 4 illustrates an embodiment for removing an EMV chip from a plastic credit card or debit card and placing the removed EMV chip onto a metal card by applying an adhesive coating to the bottom face and the bended four sides of the EMV chip. In an embodiment, the adhesive coating can be a cyanoacrylate adhesive coating, for example, ethyl-2-cyanoacrylate. In other embodiments, the adhesive can be one more an epoxy adhesives.

FIGS. 1-4 illustrate various embodiments for removing an EMV chip from a plastic credit card or debit card and placing the removed EMV chip onto a metal card by placing the adhesive coated bottom face and bended four sides of the EMV chip into a holding cavity of the metal card. In an embodiment, the holding cavity in the metal card has sufficient length, width, and depth to hold the EMV chip. In an embodiment, suitable pressure can be applied on the EMV chip in the holding cavity of the metal card for about 10 to about 30 seconds to cure the adhesive. In other embodiments, the EMV chip in the holding cavity of the metal card and the metal card itself can be cleaned with a solution of isopropanol and water to remove any excess adhesive.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The invention claimed is:

1. A method of removing an EMV chip from a plastic credit card or debit card and placing the removed EMV chip onto a metal card, comprising:

heating the plastic credit or debit card containing the EMV chip to loosen the EMV chip, the EM V chip being substantially square and planar, the EMV chip having an upward top face, a downward bottom face, and four sides;

removing the loosened EMV chip from the plastic credit or debit card;

bending the four sides of the EMV chip towards the downward bottom face of the EMV chip;

applying an adhesive coating to the bottom face and the bended four sides of the EMV chip; and placing the adhesive coated bottom face and bended four sides of the EMV chip into a holding cavity of the metal card.

2. The method of claim 1, further comprising heating a front face and a back face of the plastic credit or debit card containing the EMV chip with a heat gun to loosen the EMV chip.

3. The method of claim 2, further comprising heating the front face and the back face of the plastic credit card containing the EMV chip with a heat gun from between about 350° F. to about 400° F.

4. The method of claim 3, further comprising heating the front face and the back face of the plastic credit or debit card containing the EMV chip with a heat gun at about 370° F. for about 10 seconds to about 30 seconds.

5. The method of claim 1, further comprising removing the loosened EMV chip from the plastic credit or debit card using a pick.

6. The method of claim 1, further comprising bending the four sides of the EMV chip towards the downward bottom face of the EMV chip, each of the bended four sides being substantially perpendicular to the downward bottom face.

7. The method of claim 1, further comprising applying a cyanoacrylate adhesive coating to the bottom face and the bended four sides of the EMV chip.

8. The method of claim 7, wherein the cyanoacrylate adhesive coating comprises ethyl-2-cyanoacrylate.

9. The method of claim 1, further comprising applying pressure on the EMV chip in the holding cavity of the metal card for about 10 to about 30 seconds to cure the adhesive.

10. The method of claim 1, further comprising cleaning the EMV chip in the holding cavity of the metal card and the metal card with a solution of isopropanol and water to remove any excess adhesive.

11. The method of claim 1, wherein the metal card is a stainless steel metal card.

* * * * *